United States Patent Office 2,850,881
Patented Sept. 9, 1958

2,850,881
METHOD AND APPARATUS FOR PURIFYING NITROUS OXIDE

Robert S. Hampton, Orinda, and John J. Connolly, Millbrae, Calif., assignors to Coyne Chemical Company, Memphis, Tenn., a corporation of Tennessee Application January 11, 1957, Serial No. 633,772

16 Claims. (Cl. 62—32)

This invention relates to a method and apparatus for the purification of nitrous oxide and more particularly to the removal of certain gases, mainly nitrogen, with some oxygen and nitric oxide NO, which are noncondensable at the boiling point of nitrous oxide—131° F. Hereafter in speaking of nitrogen, the other noncondensables as here defined are understood to be included.

The present invention employs a high pressure stripper column to remove the nitrogen ($N_2$) from the liquefied nitrous oxide ($N_2O$) in a mixture of nitrous oxide and nitrogen produced by conventional means. The stripper column is provided with what is termed herein a "warm" condenser at its top, and also, as a separate piece of equipment, a "cold" condenser, which nearly completes the condensation of the nitrous oxide. Inasmuch as the process at this point produces a product in which substantially all of the impurity is nitrogen, it will be apparent that the purification of $N_2O$ in accordance with the present invention results in a more satisfactory purity than is accomplished by conventional means.

Accordingly, one of the principal objects and advantages of the present invention is the production of $N_2O$ of higher purity than ordinarily obtained by conventional equipment and processes.

Another advantage of the present invention is the elimination of waste of $N_2O$ inherent in prior methods of purification and also eliminates shutting down the equipment to discharge accumulated $N_2$, as is frequently necessary in previous installations.

A further advantage of the invention is the saving of lost time of employees by eliminating blow back of impurities with consequent build-up and rehandling, all of which are required by prior methods. Thus the present invention provides a method whereby cylinders are filled, tested and prepared for shipment with only a single handling.

Still another advantage of the present invention is that the use of a separate cold condenser results in economies in the cost of the equipment required, for the reason that such cold condenser does only a small portion of the refrigerating duty and hence the cold condenser may be made of small size.

The equipment hereinafter described in detail employs a stripper column which has a "warm" condenser at the top of the column cooled by a cooling medium such as $N_2O$, Freon, or water. The gases at the top of the column pass to the second or "cold" condenser, which is at considerably lower temperature than the warm condenser, and in such cold condenser substantially all of the remaining $N_2O$ is condensed and recirculated to the stripper column. Preferably the cold condenser is cooled by the expansion of $N_2O$, thereby resulting in a simple process with cold enough waste product to minimize loss of $N_2O$ with waste nitrogen.

As has been stated, two separate condensers are employed and this results in important advantages and economies. If a single condenser were installed at the top of the stripper column, it would be necessary to maintain in such single condenser a very low temperature in order to condense a satisfactory percentage of the $N_2O$. If such severe low temperature were not maintained, then the loss of $N_2O$ would make the yield unsatisfactory.

Because of the low temperature in the stripper which would be mandatory if a single condenser were employed, the equipment would necessarily be fabricated of a special material which has good impact properties at low temperature, such as stainless steel. This would greatly increase the cost of the equipment as compared with the carbon steel employed in the construction of the stripper column hereinafter described.

The use of $N_2O$ as the refrigerant in the cold condenser eliminates the necessity of using a special refrigerant therein. Further, $N_2O$ can also be used as a refrigerant to cool the warm condenser of the stripper column and also to cool the product subcooler which is conventionally used to reduce the temperature of the product immediately before filling into the cylinders in which the $N_2O$ is merchandised. Accordingly, when $N_2O$ is thus employed as a refrigerant, the system required no special refrigerant and also does not require the separate compressor required in an auxiliary refrigerating system. Particularly in a small plant the cost of equipment is thus materially reduced without so seriously increasing the power requirements as to overbalance the initial equipment cost. Simplified operation and reduced maintenance problems are also a significant advantage to using the $N_2O$ as the refrigerant.

Other objects of the present invention will become apparent upon reading the following specification and referring to the accompanying drawings in which similar characters of reference represent corresponding parts in each of the several views.

A conventional plant for the manufacture of $N_2O$ employs as a raw material ammonium nitrate, which is thermally decomposed in accordance with the ideal reaction $NH_4NO_3 \rightarrow N_2O + 2H_2O$. However, the reaction as commercially practiced yields nitric acid, ammonia, various oxides of nitrogen other than $N_2O$, nitrogen and oxygen. The thermal decomposition is ordinarily carried out by melting the ammonium nitrate in a pot and raising its temperature to approximately 400° F. The liquid is then drawn off and poured into a bank of smaller retorts where the temperature is raised high enough to cause the reaction to proceed at a reasonably rapid rate. This will be approximately 490° F. The gases are passed through a water-cooled stainless steel coil connected to each pot, which cools the gas and condenses out some of the impurities, particularly nitric acid, and from the coil the gases pass through a glass bubbling pot so that the rate of flow can be observed and then into a manifold. From the manifold the gas passes through a caustic soda scrubbing tower, then through a sulphuric acid scrubbing tower, and then through a water-wash tower. The three towers remove substantially all the impurities except nitrogen. The gases are then piped into a gasometer. The equipment heretofore described is conventional and forms no part of the present invention.

Figure 1:
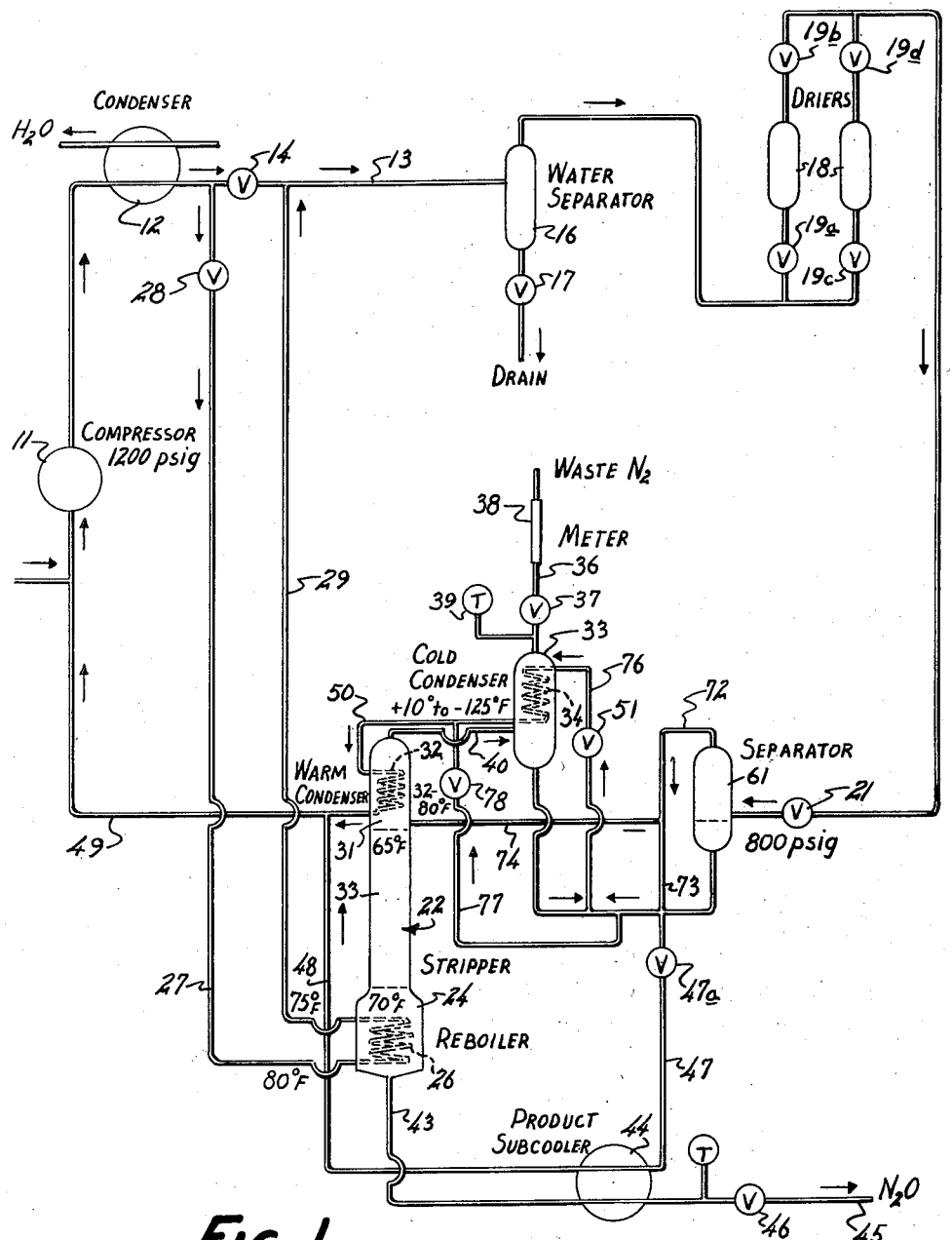
Fig. 1 is a schematic view showing the system which comprises the present invention.

In the modification of the invention illustrated in Fig. 1, from the gasometer the gas passes through a compressor 11 operating normally at 900 to 1500 p. s. i. g. It will be understood that the pressures and temperatures indicated in the accompanying drawings and mentioned in this description are approximate, but those indicated have been found to be commercially satisfactory. A water-cooled condenser 12 reduces the temperature of the gas and liquefies most of the $N_2O$. The mixture is directed through valve 28. From valve 13 the mixture passes through the reboiler coil 26 of the stripper column 22 and then enters a high-pressure water separator 16 which separates most of the condensed water, which is periodically drained out through drain valve 17. From the water separator the mixture passes through one of two high-pressure driers 18 packed with activated alumina which removes substantially all water and oil vapor remaining. Valves 19a, b, c and d control passage alternately through driers 18. At this point in the process all impurities except noncondensable gases, mainly nitrogen, have been removed. Governing or throttling valve 21 beyond driers 18 reduce the pressure to 700 to 1000 p. s. i. This cools the mixture and aids in condensing $N_2O$.

Digressing from the description of the system as a whole to a description of the rectification portion of the system, the present invention employs a stripper column 22 which is more or less of conventional construction. The central portion 23 of the column is packed with conventional packing. Below central portion 23 is a reboiler 24 having a copper coil 26 through which circulates a liquid at a temperature about 15° F. higher than that of the liquid in the reboiler and thus warms the liquid to cause the $N_2O$ to rise and keep the central portion of the column active so that the nitrogen is stripped from the liquid flowing down through the packing. The circulating medium for the reboiler coil may be $N_2O$ as shown in the accompanying drawings. In such installation $N_2O$ is conducted by line 27 from a point beyond the compressor condenser through governing valve 28 to the coil and thence back through line 29 to a point beyond bypass valve 14. The amount of stripping action in the column can be controlled by varying water rate to condenser 12. A reduction in cooling water flow rate will increase the $N_2O$ temperature in line 27, and hence increase the reboiling rate for a given column pressure. Such increase in the reboiling rate will require additional cooling in the warm condenser, or the pressure of the column will rise. It will be understood that the choice of a heating medium for the reboiler coil 26 is optional. Above central portion 23 of stripper column 22 is the portion of the equipment herein termed the "warm" condenser 31, which desirably operates at 32° to 80° F. Such a temperature does not necessitate the use of stainless steel or other special equipment in the stripper column and yet condenses a very large percentage of the $N_2O$ coming off the stripper column in gaseous phase. A cooling medium circulates through warm condenser coil 32 to condense a major portion of the condensable vapors given off from column 22. The coolant in warm condenser 31 is hereinafter discussed.

Adjacent to but separate from warm condenser 31 is a separate tank herein denominated the "cold" condenser 33, which is maintained at a temperature of +10 to −125° F. by circulation of refrigerant through cold condenser coil 34 as hereinafter described. In cold condenser 33 substantially all of the nitrous oxide in the gaseous part of the mixture is condensed, with the result that only a trace of $N_2O$ remains in the waste gas outlet line 36 which discharges continuously through waste valve 37 and meter 38 into the atmosphere. The temperature of the waste gas and its volume are observed carefully by thermometer 39 and rotometer 38 so that the waste of $N_2O$ may be minimized. Subject to limitations of the equipment and ease of operation, the colder the waste gas, the better, as this allows least escape of the $N_2O$ with the waste $N_2$. The cold condenser shell 33 is preferably fabricated of stainless steel or other material with suitable impact properties at low temperature, but because most of the work of condensing the $N_2O$ takes place in warm condenser 31, the size of cold condenser 33 is relatively small and hence its cost is not excessive.

Figure 2:
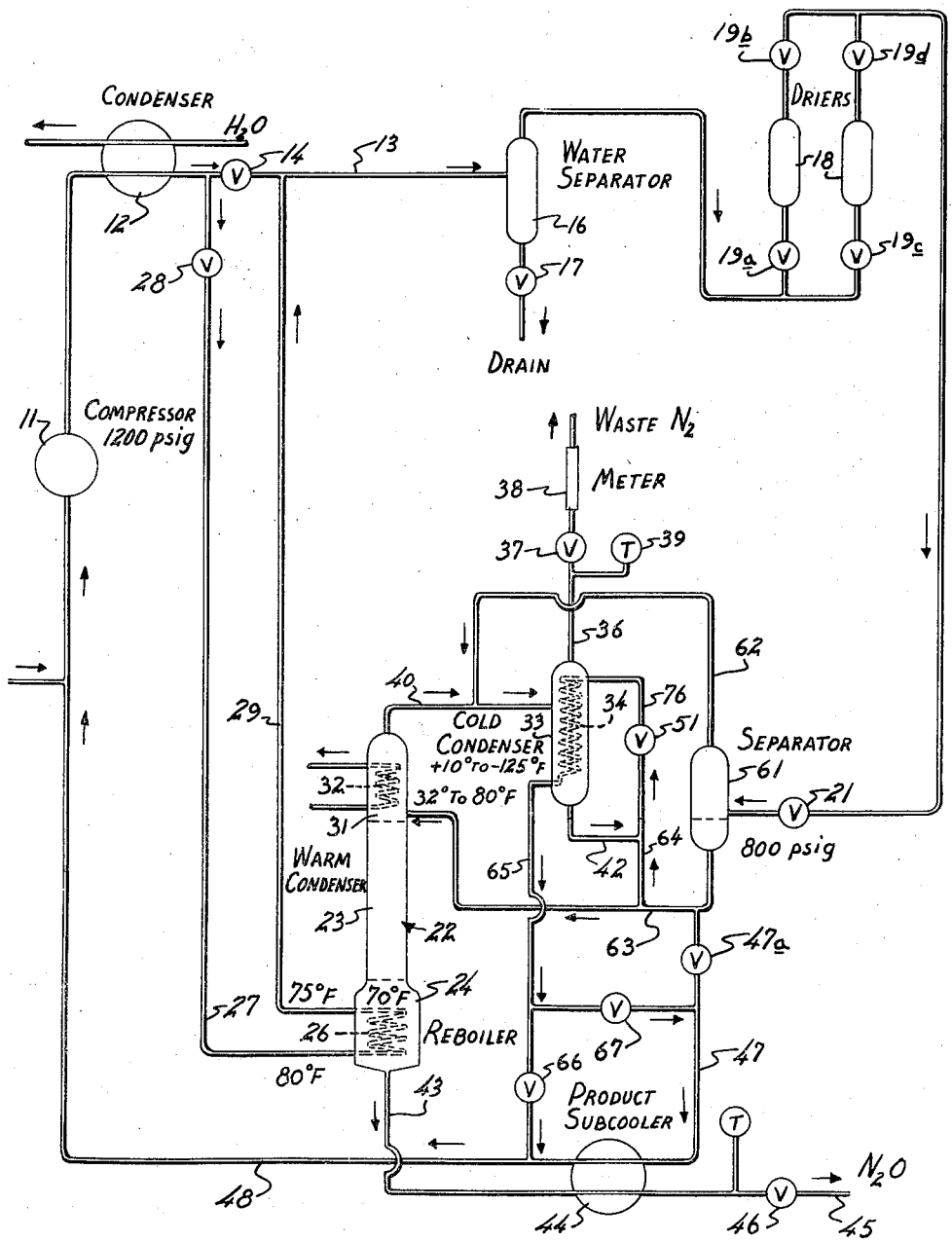
Fig. 2 is a modification thereof.

The system heretofore described and stripper 22 and cold condenser 33 are essentially the same in the modifications of Figs. 1 and 2. Turning now to the system illustrated in Fig. 1, after the gas has been passed through valve 21, it is conducted through line 41 to separator 61 where separation of vapor and liquid is accomplished. Vapor transferred from separator 61 through pipe 72 and a portion of the liquid from pipe 73 are mixed in pipe 74 and led to the warm condenser 31 of stripper column 22. The liquid $N_2O$ which contains some nitrogen therein trickles down central portion 23 of the stripper column and the $N_2$ separates out as is conventional in the operation of stripper columns. Boiling the liquid in reboiler 24 causes gas to pass up through the stripper, thus stripping $N_2$ from the descending liquid. Some of the $N_2O$ and the major part of $N_2$ leave warm condenser 31 in gaseous state and are conducted by conduit 40 to cold condenser 33. The liquid product, which is substantially pure $N_2O$, is drawn off from the bottom of reboiler 24 through conduit 43 and passed through a product subcooler 44 which reduces the temperature immediately prior to dispensing at cylinder-filling station 45 where the liquefied gas is dispensed into cylinders through valve 46. The product subcooler 44 may be cooled by a cooling medium, such as Freon or water, or, as shown in the accompanying drawings, a portion of the $N_2O$ may be drawn off from separator 61 and cold condenser 33 through throttling valve 47a and conduit 47, used as a refrigerant in the subcooler 44 and thence conducted back through pipes 48 and 49 to a point in the line before compressor 11.

The cold condenser cooling coil 34 is preferably refrigerated by liquid $N_2O$ drawn off from the bottom of cold condenser 33 and separator 61 through throttling valve 51, in conduit 76. As shown in accompanying Fig. 1, the refrigerant discharged from cooling coil 34 passes through conduit 50 to cooling coil 32 of warm condenser 31 and thence is conducted by line 49 back to a point in main line before compressor 11. A bypass line 77 having installed therein a bypass valve 78 conducts liquid $N_2O$ from cold condenser 33 and separator 61 to warm condenser coil 32 if and when additional cooling of the warm condenser 31 is required.

The modification of Fig. 2 differs in several respects from that of Fig. 1. Essentially similar parts of the system are marked with the same reference numerals and not herein described in detail. Beyond valve 21 is separator 61 which separates the gaseous from the liquid portions of the mixture. The gaseous portions are transmitted through conduits 62 and 40 to cold condenser 33 and liquid portions are transmitted through conduit 63 to the stripper column, through conduit 64 to cold condenser coil 34 and through conduit 47 to product subcooler 44. The liquid from cold condenser 33 passes through conduit 42 and augments the supply of $N_2O$ passing through cold condenser coil 34 after mixing with the liquid in conduit 64. As is also the case in Fig. 1, the separator 61 and the cold condenser 33 are located at such an elevation that the liquid level in each is only slightly above the elevation of the inlet to column 22. The trap in each of conduits 42 and 63, respectively, prevent vapor from passing through these lines, while the elevation of the entry to the column prevents liquid from filling separator 61 and from flooding the cold condenser coil. Thus vapor cannot pass through the liquid line to the cold condenser, which prevents vapor by passing coil 32.

In the modification of Fig. 2, warm condenser coil 32 is cooled by an independent cooling medium, such as Freon or water, rather than $N_2O$, as in Fig. 1. In this case the gas leaving cooling coil 34 of cold condenser 33 through line 65 passes through valve 67 and through line 47 to product subcooler coil 44 and thence back to compressor 11. It will further be noted that by opening valve 47a additional refrigeration can be obtained for further subcooling the product as required. Thus the liquid nitrous oxide can be charged into cylinders at the column operating pressure, even if the cylinders are initially at a higher temperature than the liquid nitrous oxide boiling point at column pressure.

The system heretofore described employs in essence the ultimate separation of the non-condensable nitrogen from the condensable N₂O by use of a stripper column 22 and two separate condensers 31 and 33, the "warm" condenser 31 being installed in the top of column 22 and cold condenser 33 being separate but connected thereto. The "warm" condenser is maintained at relatively moderate temperatures of 32 to 80° F. which are sufficient to condense most of the condensable material passing off the stripper column, whereas the "cold" condenser is maintained at a considerably lower temperature of +10 to −125° F. to complete the separation of nitrogen and N₂O. This arrangement permits stripper column 22 to be constructed of carbon steel or other relatively inexpensive material, while the "cold" condenser 33 is made of stainless steel, but is required to be only of such size as to make the cost of the material of its manufacture relatively unimportant.

In normal operation of the system, assuming that operation has been stopped only temporarily and the system is already up to pressure and there is some liquid in reboiler 24, drier 18, etc., recycle valve 47ᵃ or 66 is set at the normal position for warm condenser 31 to give the desired reflux in column 22. As the liquid level increases in reboiler 24, it will gradually be of greater purity. In the event that the maximum liquid level is reached before the desired purity is obtained, recycle valve 47ᵃ or 66 is opened to increase the amount of product recycled until the desired purity is finally attained, it being understood that total recycling may be necessary for a short time in order to reach such purity. In practical experience it has been found that purity is obtained quickly and extensive recycling will not be required. In the system shown in Fig. 2, after desired purity has been attained and adequate liquid has accumulated in reboiler 24, expansion valve 67 is opened to proper position to circulate gas through subcooler 44 for precooling the product filling cylinders, as determined by the temperature of the product leaving the subcooler. If the cylinders are exceptionally warm, the initial liquid charge may have to be cooled to below 30° F. The filling valve 46 is adjusted to drop the liquid level at a reasonable rate so a sudden change in volume does not affect column traffic in stripper 22— i. e., the volume of liquid removed must be small per unit time relative to the volume rate of gas evolved from the reboiler.

From the standpoint of power requirements, use of N₂O refrigerant in the warm condenser coil 32 is inefficient. However, in order to simplify the equipment, the use of N₂O as a refrigerant is desirable, particularly when it is transferred to warm condenser coil 32 from cold condenser coil 34, as in Fig. 1. With respect to sub-cooling of the product in subcooler 44, while the use of N₂O as a refrigerant at such a warm temperature is not efficient, the power cost for compressing N₂O is nominal compared with other costs.

The process is very easy to control manually. The actual temperature and pressure in column 22 are not critical over quite a wide range of, say 700 p. s. i. g. to 1000 p. s. i. g. With the recycle to warm condenser 31 set at a satisfactory rate, it may not be changed until compressor 11 is shut down, inasmuch as the system is self-stabilizing. If the feed temperature rises, the normal pressure will rise, but the condenser and reboiler duties will remain constant. If the column pressure goes too high, as shown by decrease in purity, the recycle may have to be increased to reduce the column pressure. The pressure must not come too close to the critical point, above which no separation would take place. It will further be understood that the efficiency of separation decreases as the pressure in the column approaches such critical pressure.

Figure 3:
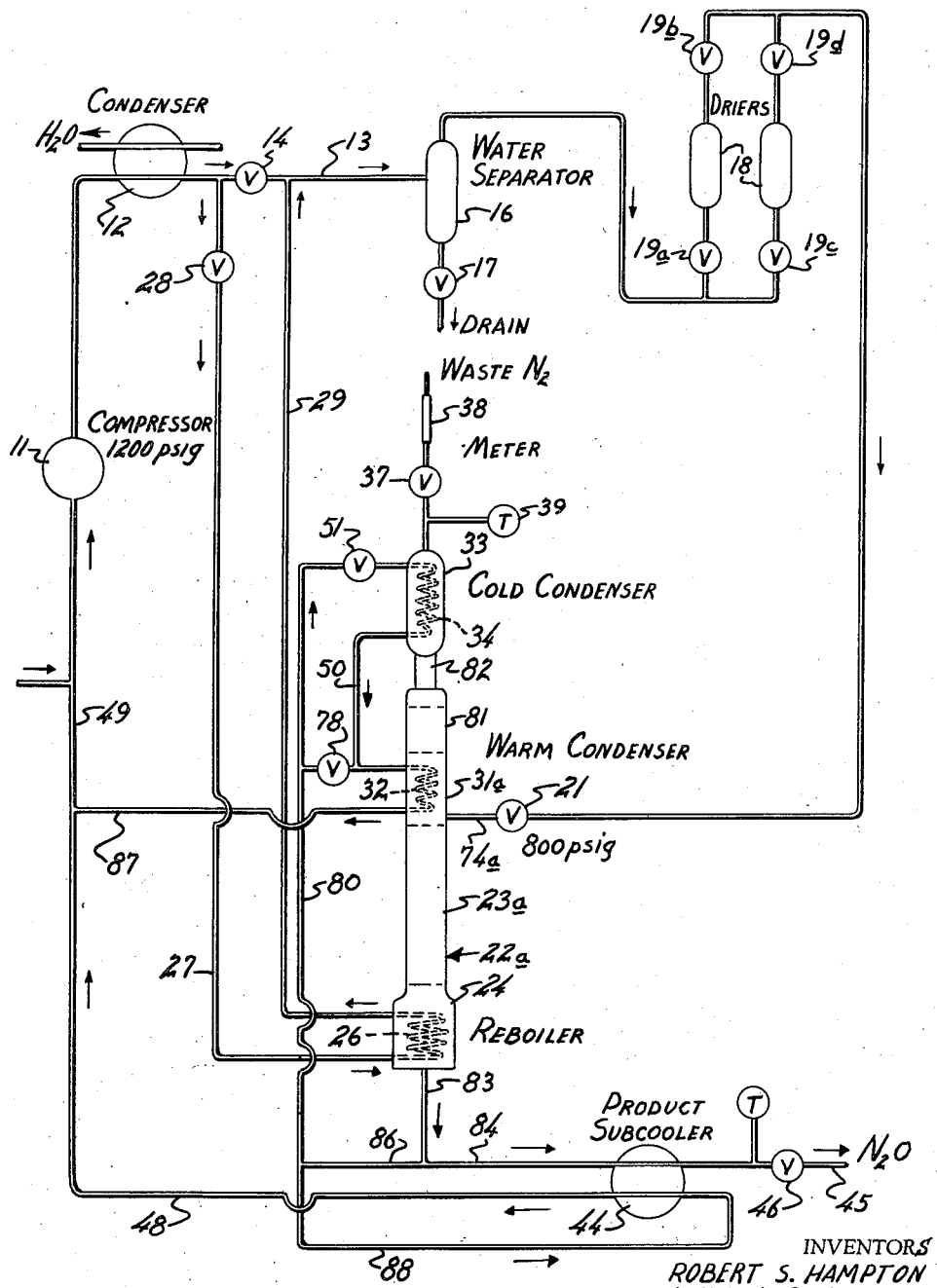
Fig. 3 is another modification thereof.

In the modification shown in Fig. 3, the vapor and liquid discharged from valve 21 are conducted directly through pipe 74ᵃ to stripper column 22ᵃ and specifically to the bottom of warm condenser 31ᵃ. Stripper column 22ᵃ differs from that shown in the previous modifications in that the packing is divided into two sections, one section 23ᵃ being interposed between the warm condenser 31ᵃ and reboiler 24 and the other section 81 of the packing being positioned above warm condenser 31ᵃ, the column being correspondingly increased in height to provide space for the portion 81. The upper end of column 22ᵃ is connected by conduit 82 to cold condenser 33. Accordingly, vapor given off from stripper column 22ᵃ and not condensed by the warm condenser 31ᵃ passes up through the upper packing 81 and thence through conduit 82 to cold condenser 33. The liquid condensed in cold condenser 33 passes down through conduit 82 and packing 81. The major portion of the liquid accumulating at the bottom of reboiler 24 is conveyed by pipes 83 and 84 through the product subcooler 44 and valve 46 to dispensing station 45. A portion of the liquid from the reboiler is conducted by pipes 86 and 80 and the valve 51 through coil 34 of cold condenser 33 and thence through pipe 50 to coil 32 of warm condenser 31ᵃ and thence through pipes 87 and 49 for recirculation through the system. Valve 78 functions as a bypass valve to increase the flow through the warm condenser coil 32 beyond that discharged from coil condenser coil 34. Another portion of the liquid from reboiler 24 is conducted by pipe 88 through the product sub-cooler 44 and thence by pipes 48 and 49 back for recirculation.

The principal difference between the construction shown in Fig. 3 and that shown in Figs. 1 and 2 is the elimination of separator 61. Since refrigerant for coil 34 is obtained from the bottom of column 22ᵃ rather than from the liquid portion of the feed, no separation is required. This arrangement reduces the load on the cold condenser 33 and simplifies the piping. Obtaining the refrigerant from the bottom of reboiler 24 for cold condenser coil 34 and product sub-cooler 44 increases the necessary liquid traffic in stripper column 22ᵃ for a given throughput but improves the feed purity and hence makes separation easier.

In any of the modifications heretofore described, stripper column 22 or 22ᵃ is a high-pressure column used in combination with both a warm and a cold condenser. The limits of pressure compatible with this type of operation have as their theoretical limits an upper pressure which is the critical pressure of N₂O (at and above which there would be no delineation between liquid and gas phases and hence no stripping action possible) and a low limit which is that pressure corresponding to the liquid temperature at which the cylinders can still be filled without reducing the temperature of the sub-cooling operation below the safe lower limit of temperature. In the case of N₂O the last-named temperature is approximately −20° F. and the vapor pressure of the N₂O must be appreciably above that corresponding to such temperature. Accordingly, a practical range is 700 to 1000 p. s. i. g. At the same time the cylinders are filled with pre-cooling no colder than 0° F. A distinguishing feature of the invention is the fact that cylinders are filled with pre-cooling no colder than 0° F. directly from the stripper column at the pressure of said column, with no intermediate step of pumping or compressing as part of the filling operation.

Although the foregoing invention has been described in some detail by way of illustration and example for purposes of clarity of understanding, it is understood that certain changes and modifications may be practiced within the spirit of the invention and scope of the appended claims.

What is claimed is:

1. In a system for removing non-condensables from a mixture of non-condensable and liquefiable fluids under pressure, means for supplying a mixture of said compressed fluids, a throttling valve for said mixture, a stripper column for stripping vapors from said mixture, a warm condenser in the upper portion of said stripper column, means for cooling said warm condenser, a cold condenser receiving vapor from said warm condenser, a cold condenser coil in said cold condenser, a governing valve for throttling of refrigerant into said cold condenser coil, a first conduit conducting at least a part of the liquid portion of said mixture from said throttling valve to said stripper column, a second conduit conducting a portion of the liquid through said governing valve and through said cold condenser coil, a third conduit conducting gas from said cold condenser coil for recirculation through said system, a fourth conduit for venting non-condensable gas from said cold condenser, and a fifth conduit for conducting purified liquid from said stripper column.

2. In a system according to claim 1, a product subcooler, said fifth conduit passing through said subcooler, and means for circulating liquid from said throttling valve through said subcooler and thence for recirculation through the system.

3. A system according to claim 1 which further comprises a separator adjacent said throttling valve and in which said first conduit conducts all of the gas and part of the liquid from said separator to said stripper column and said second conduit also conducts liquid from said cold condenser to said governing valve.

4. A system according to claim 3 in which is further provided a product subcooler through which said fifth conduit passes, a sixth conduit conducting part of the liquid from said second conduit through said product subcooler and thence for recirculation through the system and a second throttling valve in said sixth conduit ahead of said product subcooler.

5. A system according to claim 3 in which said means for cooling said warm condenser comprises a warm condenser coil installed in said third conduit.

6. In a system according to claim 1, a separator adjacent said throttling valve for separating said mixture of fluids into gases and liquids, and a sixth conduit conducting at least the gaseous portion of said mixture from said separator to said cold condenser.

7. A system according to claim 1 in which said first conduit conducts all of the gaseous and liquid portion of said mixture from said throttling valve to said stripper column and said second conduit conducts liquid from the bottom of said stripper column to said governing valve.

8. In a system according to claim 1, a reboiler in said stripper column, and means for conducting a compressed mixture of said fluids through said reboiler and thence back for recirculation through said system.

9. In a system for removing non-condensables from a mixture of non-condensable and liquefiable fluids under pressure, a stripper column for stripping gases from said mixture, a warm condenser in the upper portion of said stripper column, a cold condenser separate from said warm condenser, a cold condenser coil in said cold condenser, a governing valve for throttling of refrigerant into said cold condenser coil, a first conduit conducting a portion of said mixture to said cold condenser coil, a governing valve in said first conduit, a second conduit conducting a portion of said mixture to said stripper column, a warm condenser coil in said warm condenser, means for conducting gases and liquid from said cold condenser coil to said warm condenser coil, a third conduit conducting gas from said warm condenser coil for recirculation through said system, and a fourth conduit for conducting purified liquid from said stripper column.

10. In a system for removing non-condensables from a mixture of non-condensable and liquefiable fluid under pressure, a compressor for compressing said mixture, a condenser for cooling the mixture compressed by said compressor, means connected to said condenser for removing moisture from said mixture, a throttling valve beyond said last-named means, a stripper column for stripping gases from said mixture, a warm condenser in the upper portion of said stripper column, means for cooling said warm condenser, a cold condenser separate from said warm condenser and receiving vapor from said warm condenser, a cold condenser coil in said cold condenser, a governing valve for throttling of refrigerant into said cold condenser coil, a first conduit conducting at least a portion of said mixture from said throttling valve to said governing valve, a second conduit conducting a portion of said mixture from said throttling valve to said stripper column, a third conduit conducting gas from said cold condenser coil for recirculation through said system, a fourth conduit for venting non-condensable gas from said cold condenser to atmosphere, and a fifth conduit for conducting purified liquid from said stripper column.

11. In a system for purifying nitrous oxide from a mixture of nitrous oxide and nitrogen under pressure, a compressor for compressing said mixture, a condenser receiving said mixture from said compressor to cool said mixture, a throttling valve beyond said condenser, a stripper column for stripping gases from said mixture, a warm condenser in the upper portion of said stripper column, means for cooling said warm condenser, a cold condenser separate from said warm condenser and receiving vapor from said warm condenser, a cold condenser coil in said cold condenser, a governing valve for throttling of refrigerant into said cold condenser coil, a first conduit conducting at least a portion of said mixture from said throttling valve to said governing valve, a second conduit conducting a portion of said mixture from said throttling valve to said stripper column, a third conduit conducting gas from said cold condenser coil for recirculation through said system, a fourth conduit for venting nitrogen from said cold condenser, and a fifth conduit for conducting purified nitrous oxide from said stripper column.

12. In a system according to claim 11 a separator for separating gas from liquid beyond said throttling valve, said first conduit conducting at least a portion of the liquid portion of said mixture from said separator to said stripper column, and means for conducting another portion of said mixture from said separator to said cold condenser coil.

13. A method of purifying $N_2O$ from a compressed mixture of $N_2O$ and $N_2$ comprising throttling said mixture, stripping at least a part of the gaseous portion of the throttled mixture, cooling the stripped vapors first at a relatively warm temperature and then separately at a relatively cold temperature, using throttled liquid $N_2O$ as a refrigerant in at least the relatively cold temperature cooling of the stripped vapors, discharging the $N_2$ from the cooled stripped vapors, subcooling the liquid $N_2O$ from which the vapors have been stripped, and dispensing into containers the subcooled liquid.

14. The method of claim 13 which further comprises using the refrigerant of said relatively cold temperature cooling as the refrigerant of the relatively warm temperature cooling of said stripped vapors.

15. The method of claim 13 which further comprises using throttled liquid $N_2O$ as a refrigerant in said subcooling of the liquid $N_2O$.

16. The method of claim 13 which comprises reboiling the stripped liquid while using as a heating medium the compressed mixture of $N_2O$ and $N_2$.

References Cited in the file of this patent

UNITED STATES PATENTS

| | | |
|---|---|---|
| 1,557,907 | Van Nuys | Oct. 20, 1925 |
| 2,535,148 | Martin | Dec. 26, 1950 |
| 2,645,104 | Kniel | July 14, 1953 |
| 2,775,103 | Koble | Dec. 25, 1956 |
| 2,779,174 | Vesque | Jan. 29, 1957 |
| 2,813,920 | Cobb | Nov. 19, 1957 |